US012573037B2

(12) United States Patent (10) Patent No.: US 12,573,037 B2
Hiasa (45) Date of Patent: Mar. 10, 2026

(54) LEARNING APPARATUS, LEARNING METHOD, TRAINED MODEL, AND PROGRAM

(71) Applicant: FUJIFILM Corporation, Tokyo (JP)

(72) Inventor: Yuta Hiasa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 296 days.

(21) Appl. No.: 18/366,628

(22) Filed: Aug. 7, 2023

(65) Prior Publication Data

US 2023/0377149 A1 Nov. 23, 2023

Related U.S. Application Data

(63) Continuation of application No. PCT/JP2022/003933, filed on Feb. 2, 2022.

(30) Foreign Application Priority Data

Feb. 10, 2021 (JP) ................................. 2021-019675

(51) Int. Cl.
*G06T 7/00* (2017.01)
*G06T 7/11* (2017.01)
(Continued)

(52) U.S. Cl.
CPC .............. *G06T 7/0012* (2013.01); *G06T 7/11* (2017.01); *G06T 7/70* (2017.01); *G06V 10/25* (2022.01);
(Continued)

(58) Field of Classification Search
CPC . G06T 7/0012; G06T 7/11; G06T 7/70; G06T 2207/10116; G06T 2207/20081;
(Continued)

(56) References Cited

U.S. PATENT DOCUMENTS 10,824,908 B1 * 11/2020 Park ........................ G06V 10/82
11,783,477 B2 * 10/2023 Yang ........................ G06N 3/08
382/157
(Continued)

FOREIGN PATENT DOCUMENTS

CN 111415342 * 7/2020 ............. G06N 3/045
CN 111275118 B * 9/2022 ............. G06N 3/045
(Continued)

OTHER PUBLICATIONS

Kun Wang et al., "Learning to Recognize Thoracic Disease in Chest X-Rays With Knowledge-Guided Deep Zoom Neural Networks", IEEE Access, Aug. 31, 2020, pp. 159790-159805, vol. 8.
(Continued)

*Primary Examiner* — Tom Y Lu
(74) *Attorney, Agent, or Firm* — JCIPRNET

(57) ABSTRACT

Provided are a learning apparatus, a learning method, a trained model, and a program capable of efficiently performing learning for disease detection with high accuracy while suppressing a cost. A learning apparatus (100) includes a processor (129), a memory (114) that stores a data set of a medical image and lesion information included in the medical image, and a learning model (126) with an attention mechanism (128) that estimates a disease from an input medical image. The processor performs processing of specifying a position of a region of interest indicated by an attention map (208) in organ labeling information (206), and outputting a specification result (210), processing of calculating an error by comparing an estimation result (212) with lesion information (204), processing of setting the error on the basis of the specification result (210), and processing of causing the learning model (126) to perform learning by using the set error.

18 Claims, 14 Drawing Sheets

(51) Int. Cl.
    *G06T 7/70*          (2017.01)
    *G06V 10/25*        (2022.01)
    *G06V 10/774*      (2022.01)
    *G06V 10/776*      (2022.01)
    *G06V 20/70*        (2022.01)

(52) U.S. Cl.
    CPC .......... *G06V 10/774* (2022.01); *G06V 10/776*
      (2022.01); *G06V 20/70* (2022.01); *G06T*
      *2207/10116* (2013.01); *G06T 2207/20081*
      (2013.01); *G06T 2207/20084* (2013.01); *G06T*
      *2207/30048* (2013.01); *G06T 2207/30061*
      (2013.01); *G06T 2207/30096* (2013.01); *G06T*
      *2207/30101* (2013.01); *G06V 2201/031*
      (2022.01); *G06V 2201/032* (2022.01)

(58) Field of Classification Search
    CPC . G06T 2207/20084; G06T 2207/30048; G06T
      2207/30061; G06T 2207/30096; G06T
      2207/30101; G06T 2207/30064; G06T
      7/194; G06V 10/25; G06V 10/774; G06V
      10/776; G06V 20/70; G06V 2201/031;
      G06V 2201/032; G06V 10/82; G06N
      3/0464; A61B 6/5217
    See application file for complete search history.

(56) References Cited

U.S. PATENT DOCUMENTS

| | | | | |
|---|---|---|---|---|
| 11,837,354 | B2 * | 12/2023 | Li | ........................ G06N 3/047 |
| 12,148,157 | B1 * | 11/2024 | Li | ........................ G06T 7/0012 |
| 12,169,933 | B2 * | 12/2024 | Ye | ........................ G06V 10/764 |
| 12,283,051 | B2 * | 4/2025 | Park | ........................ G06T 7/70 |
| 2020/0410671 | A1 * | 12/2020 | Peng | ..................... G06N 3/084 |
| 2021/0216823 | A1 | 7/2021 | Oosake | |
| 2022/0222928 | A1 | 7/2022 | Sasaki et al. | |
| 2024/0378725 | A1 * | 11/2024 | Kotoku | ................... G06N 3/00 |

FOREIGN PATENT DOCUMENTS

| | | | | |
|---|---|---|---|---|
| JP | 2020042559 | | 3/2020 | |
| WO | 2020059446 | | 3/2020 | |
| WO | 2020230244 | | 11/2020 | |
| WO | WO 2022170203 | * | 8/2022 | ............. G16H 30/40 |
| WO | WO-2022170203 A1 | * | 8/2022 | ............. G16H 30/40 |

OTHER PUBLICATIONS

Abdullah-Al-Zubaer Imran et al., "Semi-Supervised Multi-Task Learning With Chest X-Ray Images", Machine Learning in Medical Imaging, Oct. 10, 2019, pp. 1-11.

"Search Report of Europe Counterpart Application", issued on Jul. 22, 2024, p. 1-p. 8.

Emanuele Pesce et al., "Learning to detect chest radiographs containing pulmonary lesions using visual attention networks", Medical Image Analysis, Jan. 9, 2019, pp. 26-38, vol. 53.

Qingji Guan et al., "Diagnose like a Radiologist: Attention Guided Convolutional Neural Network for Thorax Disease Classification", retrieved from arXiv database, arXiv:1801.09927v1 [cs.CV], Jan. 30, 2018, pp. 1-10.

Satyananda Kashyap et al., "Looking in the Right Place for Anomalies: Explainable AI Through Automatic Location Learning", retrieved from arXiv database, arXiv:2008.00363v1 [cs.CV], Aug. 2, 2020, pp. 1-6.

Yabo Fu et al., "Mask R-CNN based coronary artery segmentation in coronary computed tomography angiography", Medical Imaging 2020: Computer-Aided Diagnosis, Proc. SPIE, Mar. 16, 2020, pp. 113144F-1 - 113144F-6, vol. 11314.

"International Search Report (Form PCT/ISA/210) of PCT/JP2022/003933", mailed on Apr. 26, 2022, with English translation thereof, pp. 1-5.

"Written Opinion of the International Searching Authority (Form PCT/ISA/237) of PCT/JP2022/003933", mailed on Apr. 26, 2022, with English translation thereof, pp. 1-6.

* cited by examiner

200

204

X-RAY IMAGE ID: ZX000
DISEASE: PULMONARY NODULE

202

208

HM    R1    R3    R2

LEARNING APPARATUS, LEARNING METHOD, TRAINED MODEL, AND PROGRAM

CROSS-REFERENCE TO RELATED APPLICATIONS

The present application is a Continuation of PCT International Application No. PCT/JP2022/003933 filed on Feb. 2, 2022 claiming priority under 35 U.S.C. § 119(a) to Japanese Patent Application No. 2021-019675 filed on Feb. 10, 2021. Each of the above applications is hereby expressly incorporated by reference, in its entirety, into the present application.

BACKGROUND OF THE INVENTION

1. Field of the Invention

The present invention relates to a learning apparatus, a learning method, a trained model, and a program, and particularly to a learning apparatus, a learning method, a trained model, and a program that perform learning regarding medical images.

2. Description of the Related Art

In recent years, a technique for detecting a disease from a medical image by performing machine learning by using a multi-layer neural network has been proposed.

For example, Pesce, Emanuele, et al. "Learning to detect chest radiographs containing pulmonary lesions using visual attention networks.", Medical image analysis, 2019 proposes a semi-supervised deep learning method that simultaneously performs classification of a nodule or normal and detection of a nodule position from an input medical image. Further, Guan, Qingji, et al. "Diagnose like a radiologist: Attention guided convolutional neural network for thorax disease classification." arXiv preprint arXiv:1801.09927, 2018 proposes a deep learning method that calculates an attention for a model for learning disease classification and detects a nodule position. Kashyap, Satyananda, et al. "Looking in the Right Place for Anomalies: Explainable Ai Through Automatic Location Learning.", IEEE ISBI, 2020 proposes a method that corrects an attention of a disease classification model by using an interpretation report.

SUMMARY OF THE INVENTION

A method of detecting a disease from a medical image is broadly classified into a semi-supervised learning method of disease detection using a class label and a position label and a method of calculating an attention by learning using only a class label. In the former learning, it is necessary to annotate a position of the disease, which takes cost (time and labor). In the latter learning, the cost is relatively low, but the accuracy of disease detection is not high.

The present invention has been made in view of such circumstances, and an object of the present invention is to provide a learning apparatus, a learning method, a trained model, and a program capable of efficiently performing learning for disease detection with high accuracy while suppressing cost.

According to an aspect of the present invention for achieving the object, there is a learning apparatus comprising a processor, a memory that stores a data set of a medical image and lesion information included in the medical image, and a learning model with an attention mechanism that estimates a disease from an input medical image, in which the learning model performs processing of outputting an attention map indicating a region of interest in the medical image from the input medical image by the attention mechanism, and processing of outputting an estimation result of the disease estimated from the input medical image, and the processor performs processing of specifying a position of the region of interest indicated by the attention map in organ labeling information, which indicates a type and a region of an organ appearing in the medical image, on the basis of the organ labeling information and the attention map, and outputting a specification result, processing of calculating an error by comparing the estimation result with the lesion information, processing of setting the error on the basis of the specification result, and processing of causing the learning model to perform learning by using the set error.

According to the aspect, the specification result obtained by specifying the position of the region of interest indicated by the attention map in the organ labeling information is output on the basis of the organ labeling information and the attention map. Then, in the aspect, setting of the error obtained by comparing the estimation result with the lesion information on the basis of the specification result is performed, and learning by using the set error is performed. Accordingly, in this aspect, learning for disease detection with high accuracy can be efficiently performed.

According to another aspect of the present invention, there is provided a learning apparatus comprising a processor, a memory that stores a data set of a medical image and lesion information included in the medical image, and a learning model with an attention mechanism that estimates a disease from an input medical image, in which the learning model performs processing of outputting an attention map indicating a region of interest in the medical image from the input medical image by the attention mechanism, and processing of outputting an estimation result of the disease estimated from the input medical image, and the processor performs processing of specifying a position of the region of interest indicated by the attention map in organ labeling information, which indicates a type and a region of an organ appearing in the medical image, on the basis of the organ labeling information and the attention map, and outputting a specification result, processing of imposing a constraint on the medical image on the basis of the specification result, processing of inputting the medical image with the constraint to the learning model, processing of calculating an error by comparing an estimation result output by the learning model on the basis of the medical image with the constraint, with the lesion information, and processing of causing the learning model to perform learning by using the error.

According to the aspect, the specification result obtained by specifying the position of the region of interest indicated by the attention map in the organ labeling information is output on the basis of the organ labeling information and the attention map. In the present aspect, the constraint is imposed to the medical image by using the specification result, the medical image with the constraint is input to the learning model, and learning is performed. Accordingly, in this aspect, learning for disease detection with high accuracy can be efficiently performed.

Preferably, the processor sets the error by increasing the error in a case in which the position of the region of interest in the specification result is different from a position corresponding to the lesion information.

Preferably, the processor imposes the constraint on a location corresponding to the region of interest of the medical image in a case in which the position of the region of interest in the specification result is different from a position corresponding to the lesion information.

Preferably, a segmentation trained model that acquires the organ labeling information from the medical image is provided.

Preferably, the attention map is formed of a heat map indicating a degree of contribution to estimation of the learning model.

Preferably, the medical image is a chest X-ray image.

Preferably, the organ labeling information includes at least information indicating a region of an aorta in the medical image.

Preferably, the organ labeling information includes at least information indicating a region of a lung in the medical image.

Preferably, the lesion information includes information on a pulmonary nodule.

Preferably, the organ labeling information includes at least information indicating a region of a heart in the medical image.

Preferably, the lesion information includes information on pleural effusion.

In a learning method according to another aspect of the present invention, a processor causes a learning model with an attention mechanism, which estimates a disease from an input medical image, to perform learning by using a data set of the medical image and lesion information included in the medical image stored in a memory, in which the learning model performs processing of outputting an attention map indicating a region of interest in the medical image from the input medical image by the attention mechanism, and processing of outputting an estimation result of the disease estimated from the input medical image, and the learning method comprises a step of specifying a position of the region of interest indicated by the attention map in organ labeling information, which indicates a type and a region of an organ appearing in the medical image, on the basis of the organ labeling information and the attention map, and outputting a specification result, a step of calculating an error by comparing the estimation result with the lesion information, a step of setting the error on the basis of the specification result, and a step of causing the learning model to perform learning by using the set error.

In a learning method according to another aspect of the present invention, a processor causes a learning model with an attention mechanism, which estimates a disease from an input medical image, to perform learning by using a data set of the medical image and lesion information included in the medical image stored in a memory, in which the learning model performs processing of outputting an attention map indicating a region of interest in the medical image from the input medical image by the attention mechanism, and processing of outputting an estimation result of the disease estimated from the input medical image, and the learning method comprises a step of specifying a position of the region of interest indicated by the attention map in organ labeling information, which indicates a type and a region of an organ appearing in the medical image, on the basis of the organ labeling information and the attention map, and outputting a specification result, a step of imposing a constraint on the medical image on the basis of the specification result, a step of inputting the medical image with the constraint to the learning model, a step of calculating an error by comparing an estimation result output by the learning model on the basis of the medical image with the constraint, with the lesion information, and a step of causing the learning model to perform learning by using the error.

A program according to another aspect of the present invention causes the processor to execute each step in the above-described learning method.

A trained model according to another aspect of the present invention is trained by the above-described learning method.

According to the present invention, since the specification result obtained by specifying the position of the region of interest indicated by the attention map in the organ labeling information on the basis of the organ labeling information, the attention map, and the lesion information is output and learning for detecting a disease from the medical image is performed by using the specification result, it is possible to efficiently perform the learning of the disease detection with high accuracy.

DESCRIPTION OF THE PREFERRED EMBODIMENTS

Hereinafter, a preferred embodiment of a learning apparatus, a learning method, a trained model, and a program according to an embodiment of the present invention will be described with reference to accompanying drawings.

Figure 1:
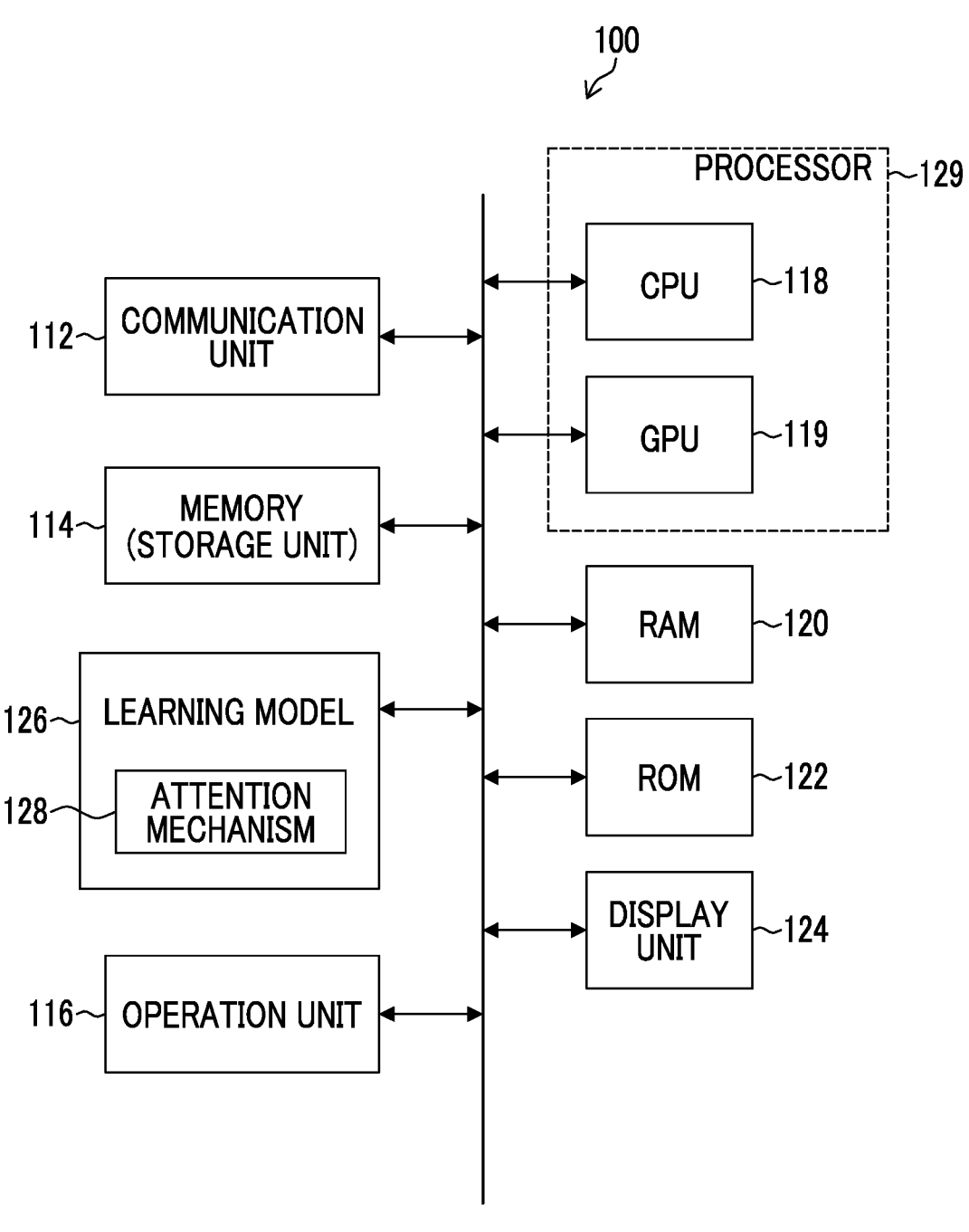
FIG. 1 is a block diagram showing an embodiment of a hardware configuration of a learning apparatus.

FIG. 1 is a block diagram showing an embodiment of a hardware configuration of a learning apparatus.

A learning apparatus 100 shown in FIG. 1 is configured by a computer. The computer may be a personal computer, a workstation, or a server computer. The learning apparatus 100 comprises a communication unit 112, a memory (storage unit) 114, a learning model 126 with an attention mechanism 128, an operation unit 116, a central processing unit (CPU) 118, a graphics processing unit (GPU) 119, a random access memory (RAM) 120, a read only memory (ROM) 122, and a display unit 124. Note that, CPU 118 and GPU 119 constitute a processor 129. Further, the GPU 119 may be omitted.

The communication unit 112 is an interface that performs communication processing with an external device in a wired or wireless manner and performs exchange of information with the external device.

The memory 114 is configured to include, for example, a hard disk device, an optical disk, a magneto-optical disk, a semiconductor memory, or a storage device configured by using an appropriate combination thereof. The memory 114 stores various programs, data, and the like necessary for image processing such as learning processing and/or image generation processing. The program stored in the memory 114 is loaded into the RAM 120, and the processor 129 executes the program, so that the computer functions as means for performing various pieces of processing defined by the program.

The operation unit 116 is an input interface that receives various operation inputs with respect to the learning apparatus 100. The operation unit 116 may be, for example, a keyboard, a mouse, a touch panel, an operation button, a voice input device, or an appropriate combination thereof.

The processor 129 reads out various programs stored in the ROM 122, the memory 114, or the like, and executes various pieces of processing. The RAM 120 is used as a work area of the processor 129. Further, the RAM 120 is used as a storage unit that temporarily stores the read-out program and various types of data.

The display unit 124 is an output interface on which various types of information are displayed. The display unit 124 may be, for example, a liquid crystal display, an organic electro-luminescence (OEL) display, a projector, or an appropriate combination thereof.

The learning model 126 is configured of a convolutional neural network (CNN) and detects a disease from a chest X-ray image. The learning model 126 is preferably configured of densely connected convolutional networks (DenseNet). The learning model 126 includes the attention mechanism 128. In a case in which a medical image is input to the learning model 126, an attention map 208 indicating a region of interest in the input medical image is output along with output of an estimation result 212 (see FIG. 2). The learning model 126 in the learning apparatus 100 has not been trained, and the learning apparatus 100 according to the embodiment of the present invention causes the learning model 126 to perform machine learning. The learning model 126 will be described in detail later.

First Embodiment

A first embodiment of the learning apparatus 100 will be described. In the following description, an example in which learning of detection of a pulmonary nodule from the chest X-ray image which is an example of the medical image is performed will be described.

Figure 2:
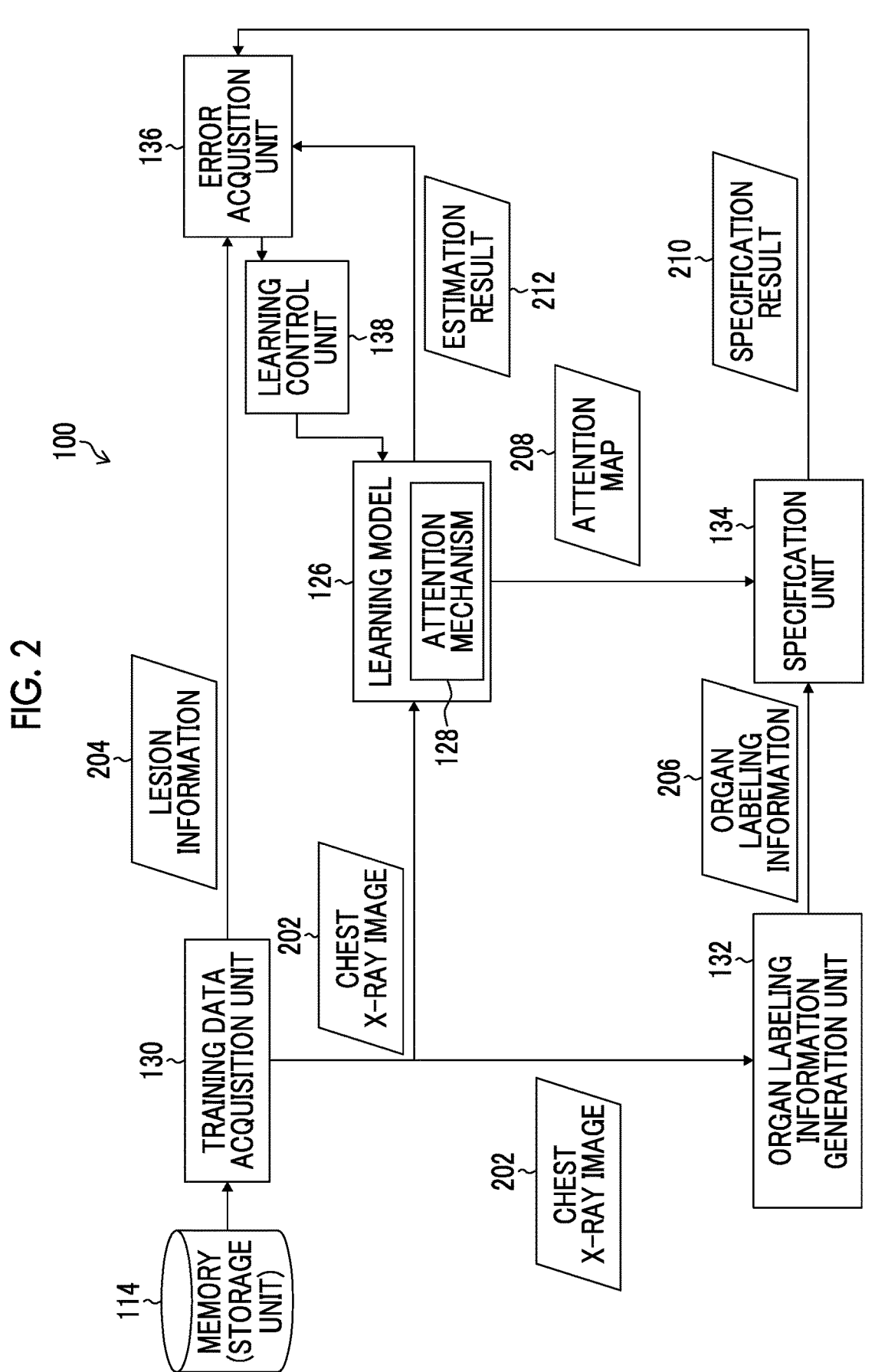
FIG. 2 is a block diagram illustrating a main function of the learning apparatus.

FIG. 2 is a block diagram illustrating a main function of the learning apparatus 100 according to the present embodiment.

The learning apparatus 100 mainly includes the memory 114, the processor 129, and the learning model 126. The processor 129 realizes functions of a training data acquisition unit 130, an organ labeling information generation unit 132, a specification unit 134, an error acquisition unit 136, and a learning control unit 138.

The training data acquisition unit 130 acquires a data set used for learning that is stored in the memory 114. For example, the data set includes the chest X-ray image and lesion information included in the chest X-ray image.

Figure 3:
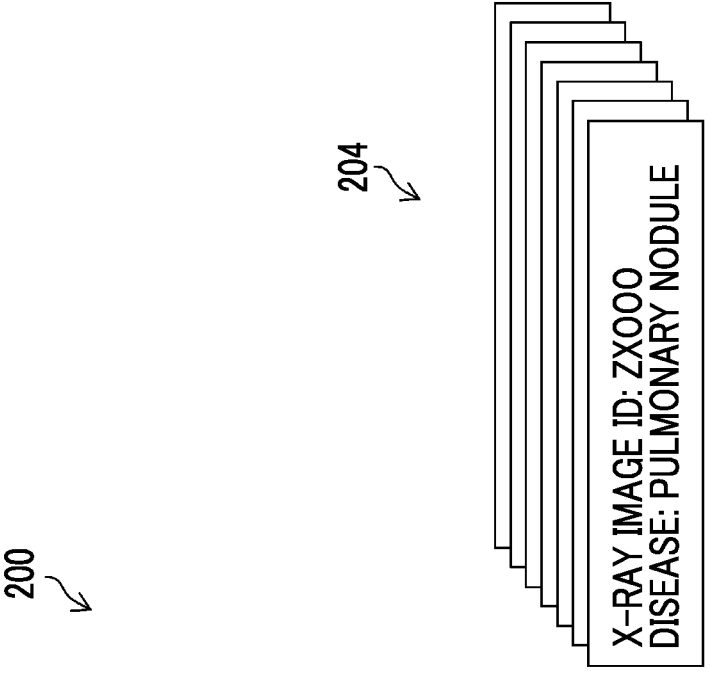
FIG. 3 is a diagram illustrating a chest X-ray image and lesion information which are an example of a data set.
Figure 3:
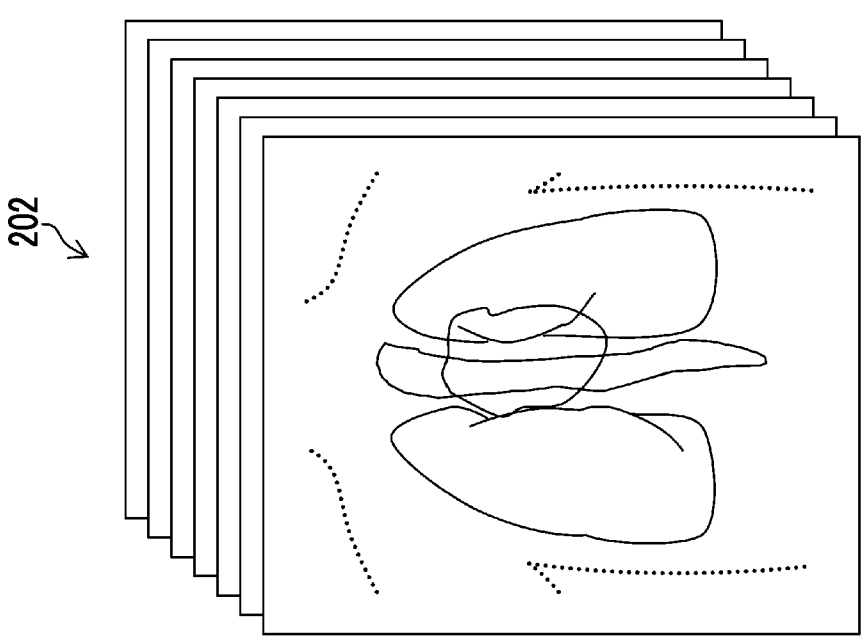

FIG. 3 is a diagram illustrating the chest X-ray image and the lesion information which are an example of the data set.

A data set 200 includes a set of a chest X-ray image 202 and lesion information 204. The memory 114 stores a plurality of data sets 200, and learning of the learning model 126 is performed by using the plurality of data sets 200.

The chest X-ray image 202 is a so-called actual X-ray image or a simple X-ray image, and is an X-ray image obtained by actually imaging a patient as a subject. As described below, an image other than the actual X-ray image can be used as the chest X-ray image 202. Further, the chest X-ray image 202 is an example of the medical image, and medical images obtained by imaging other parts are also used in the present embodiment.

The lesion information 204 corresponds to the chest X-ray image 202 and has information (disease label) related to a disease of the chest X-ray image 202. For example, the lesion information 204 has an X-ray image ID "ZXooo" for association with the chest X-ray image 202 and a disease label "pulmonary nodule" obtained by interpreting the chest X-ray image 202. The disease label is obtained by a doctor interpreting the chest X-ray image 202. In the illustrated case, since the doctor detects the pulmonary nodule by interpreting the chest X-ray image 202, the pulmonary nodule is attached as the disease label to the lesion information 204. This disease label is a ground truth label of disease detection performed by the learning model 126. The plurality of data sets 200 are stored in the memory 114, and the learning apparatus 100 performs learning of the learning model 126 by using the plurality of data sets 200.

The training data acquisition unit 130 transmits the chest X-ray image 202 acquired from the memory 114 to the learning model 126 and the organ labeling information generation unit 132, and transmits the lesion information 204 to the error acquisition unit 136.

The learning model 126 includes the attention mechanism 128, and outputs the estimation result 212 and the attention map 208 in a case in which the chest X-ray image 202 is input.

Figure 4:
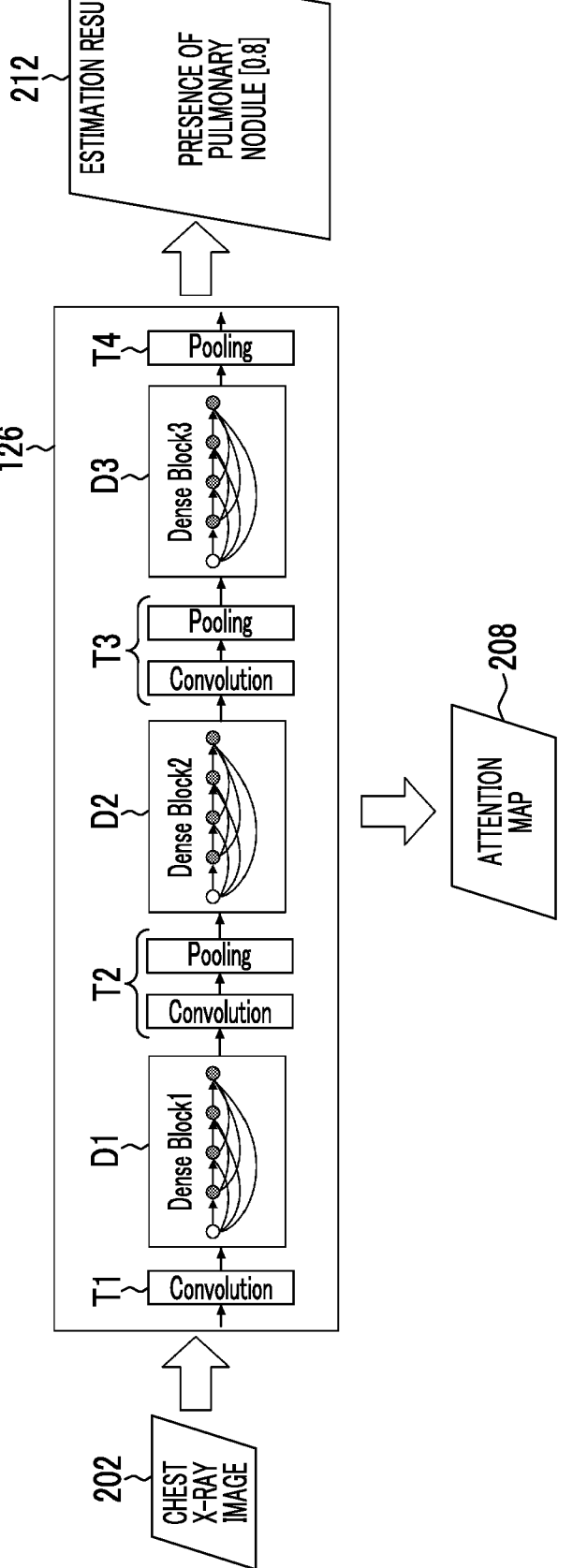
FIG. 4 is a diagram illustrating a learning model with an attention mechanism.

FIG. 4 is a diagram illustrating the learning model 126 with the attention mechanism 128.

The illustrated learning model 126 is configured by DenseNet which is an example of CNNs. As illustrated, the DenseNet includes a plurality of dense blocks D1 to D3 and a plurality of transition layers T1 to T4 before and after the dense blocks D1 to D3, and has a network structure that exhibits high performances in the task of classification (for example, disease detection). The gradient vanishing is reduced by imposing skip connections on all layers in the dense blocks D1 to D3. As the transition layers T1 to T4, a convolutional layer and/or a pooling layer is provided. The learning model 126 extracts a feature from the input chest X-ray image 202 and outputs presence or absence of the disease (pulmonary nodule) as the estimation result 212. The learning model 126 is trained to classify the chest X-ray image 202 into two categories of "presence of pulmonary nodule" and "absence of pulmonary nodule". Therefore, the estimation result 212 is output as scores corresponding to "presence of pulmonary nodule" and "absence of pulmonary nodule". In the illustrated case, a score of "presence of pulmonary nodule [0.8]" is output as the estimation result 212.

In addition, the learning model 126 includes the attention mechanism 128 and outputs the attention map 208 from the input chest X-ray image 202. The attention mechanism 128 generates the attention map 208 on the basis of a feature amount map extracted by input of the chest X-ray image 202 to the DenseNet. Note that a known method can be used as a method of generating the attention map 208, for example, a method described in a document "Wang, Fei, et al. "Residual attention network for image classification.", CVPR, 2017." is used. In addition, as another method of generating the attention map 208, a method called Grad-CAM in which a class activation mapping is calculated by using a weight gradient with respect to any trained network is also used. An example of the method is described in a document "Selvaraju, Ramprasaath R., et al. "Grad-cam: Visual explanations from deep networks via gradient-based localization.", ICCV, 2017."

Figure 5:
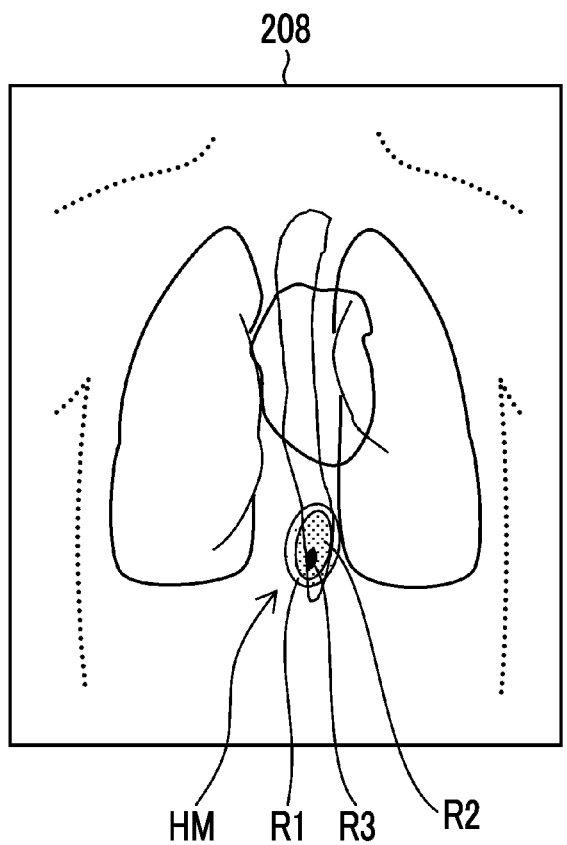
FIG. 5 is a diagram illustrating an attention map output from the attention mechanism of the learning model.

FIG. 5 is a diagram illustrating the attention map 208 output from the attention mechanism 128 of the learning model 126.

The attention map 208 visualizes a region of interest of the chest X-ray image 202 input to the learning model 126 and has a heat map HM indicating a degree of contribution to estimation of the learning model 126. The heat map HM indicates three regions having different degrees of interest. The heat map HM has a region of interest R3, a region of interest R2, and a region of interest R1 in descending order of the degree of interest. In the attention map 208, the region of interest R3, the region of interest R2, and the region of interest R1 are in an aortic region (see FIG. 6).

The chest X-ray image 202 is input from the training data acquisition unit 130 to the organ labeling information generation unit 132. The organ labeling information generation unit 132 generates organ labeling information 206 of an organ appearing in the chest X-ray image 202 on the basis of the chest X-ray image 202. Here, the organ labeling information 206 is information for identifying a type and region of each organ appearing in the chest X-ray image 202. The organ labeling information generation unit 132 can generate the organ labeling information 206 by various known methods. For example, the organ labeling information generation unit 132 generates the organ labeling information 206 from the chest X-ray image 202 by using a segmentation trained model.

Figure 6:
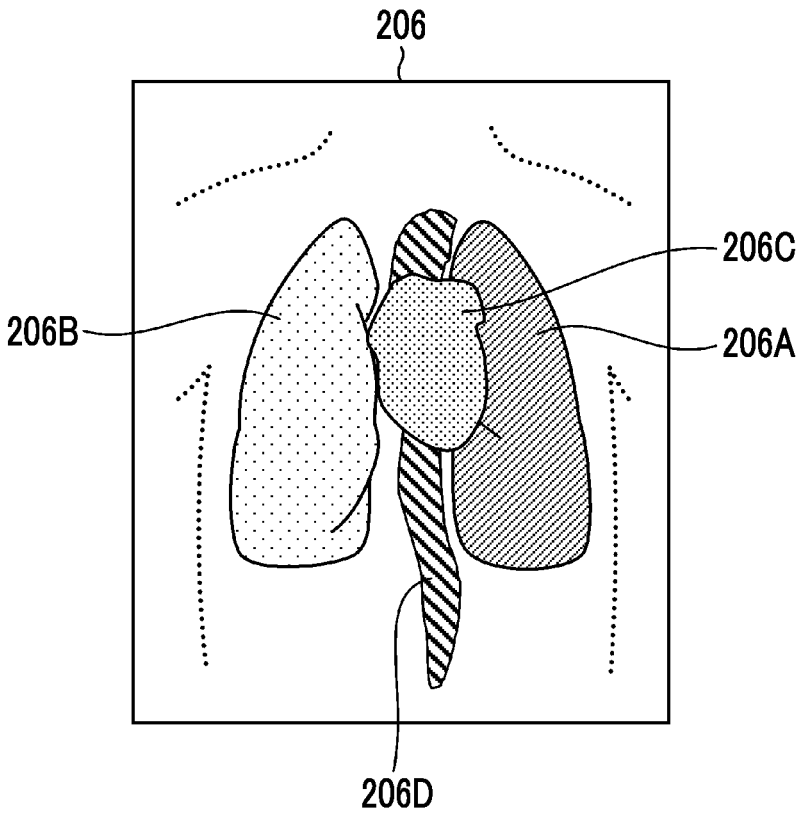
FIG. 6 is a diagram showing an example of organ labeling information acquired from the chest X-ray image.

FIG. 6 is a diagram showing an example of the organ labeling information 206 acquired from the chest X-ray image 202.

The organ labeling information 206 has labeling information of each organ appearing in the chest X-ray image 202. Specifically, the organ labeling information 206 includes labeling information 206A of a left lung, labeling information 206B of a right lung, labeling information 206C of a heart, and labeling information 206D of an aorta. Here, the labeling information 206A of the left lung indicates a region of the left lung in the chest X-ray image 202, the labeling information 206B of the right lung indicates a region of the right lung in the chest X-ray image 202, the labeling information 206C of the heart indicates a region of the heart in the chest X-ray image 202, and the labeling information 206D of the aorta indicates a region of the aorta in the chest X-ray image 202. The example of the organ labeling information 206 described above is an example, and other forms of organ labeling information may be generated. For example, as another example of the organ labeling information, organ labeling information including labeling information of a lung and labeling information of an organ other than the lung may be generated.

The attention map 208 and the organ labeling information 206 are input to the specification unit 134. The specification unit 134 specifies positions of the regions of interest R1 to R3 indicated by the attention map 208 in the organ labeling information 206 on the basis of the input attention map 208 and organ labeling information 206, and outputs a specification result 210.

Figure 7:
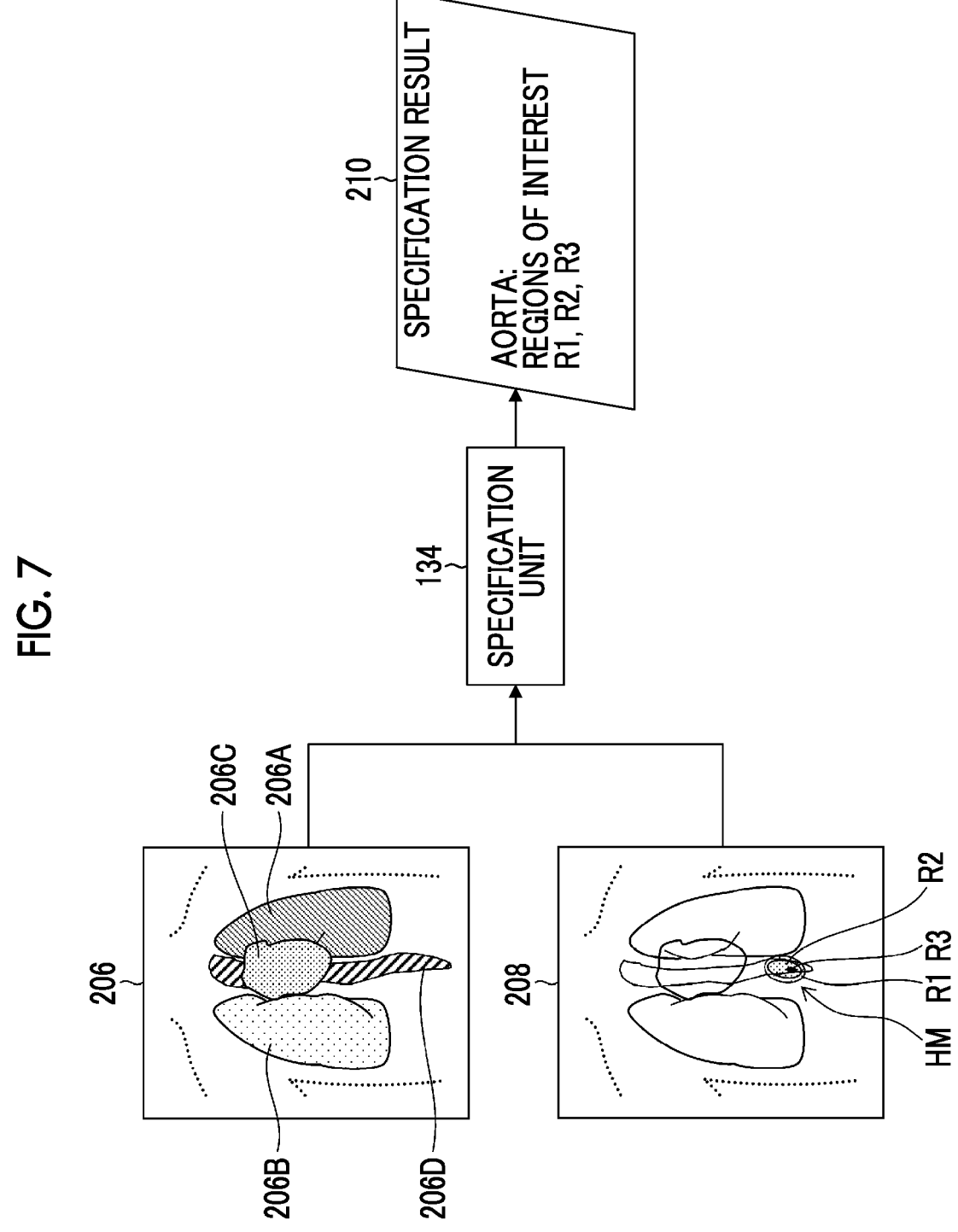
FIG. 7 is a diagram conceptually illustrating output of a specification result in a specification unit.

FIG. 7 is a diagram conceptually illustrating output of the specification result 210 in the specification unit 134.

The organ labeling information 206 and the attention map 208 are input to the specification unit 134. The specification unit 134 compares the attention map 208 with the organ labeling information 206 to specify the position of the region of interest in the organ labeling information 206. In the illustrated case, the specification unit 134 specifies that the regions of interest R1, R2, and R3 are located on the labeling information 206D of the aorta. Then, the specification unit 134 outputs the specification result 210 indicating that the regions of interest R1, R2, and R3 are located on the labeling information 206D of the aorta.

The lesion information 204, the estimation result 212, and the specification result 210 are input to the error acquisition unit 136. The error acquisition unit 136 calculates an error between the lesion information 204 and the estimation result 212 (calculation error 214: see FIG. 8), and sets the calculation error 214 on the basis of the specification result 210 (setting error 216: see FIG. 8). Specifically, the error acquisition unit 136 acquires a difference between a score of the lesion information 204 (disease label) and a score of the estimation result 212, and sets the difference as the calculation error 214. Further, in a case in which a position corresponding to the lesion information 204 does not match the region of interest, the error acquisition unit 136 increases the calculation error 214 (adds an error) to set the setting error 216. Here, the position corresponding to the lesion information 204 is a position where a disease of the lesion information 204 is detected. For example, in a case in which the lesion information 204 indicates the pulmonary nodule, the position corresponding to the lesion information 204 is a region of the lung. The error acquisition unit 136 has a list in which a disease name and a location where the disease is detected are associated with each other, and acquires the position corresponding to the lesion information 204 from the list. The position corresponding to the lesion information 204 is included in the lesion information 204, and the error acquisition unit 136 may acquire the position corresponding to the lesion information 204. The error acquisition unit 136 switches execution of setting of the calculation error 214 according to the specification result 210. Specifically, the error acquisition unit 136 sets the error in a case in which the position corresponding to the lesion information 204 and the position of the region of interest are different from each other, and does not set the error in a case in which the position corresponding to the lesion information 204 and the position of the region of interest match each other. In a case in which the position corresponding to the lesion information 204 matches the position of the region of interest, the learning model 126 outputs the estimation result 212 based on the feature amount of an appropriate region, so that appropriate learning is performed without setting the calculation error 214. On the other hand, in a case in which the position corresponding to the lesion information 204 does not match the position of the region of interest, the learning model 126 does not output the estimation result 212 based on the feature amount of the appropriate region, so that it is necessary to perform learning by using the setting error 216 obtained by setting the calculation error 214 and increasing the error. Hereinafter, acquisition of the calculation error 214 and acquisition of the setting error 216 by the error acquisition unit 136 will be specifically described.

Figure 8:
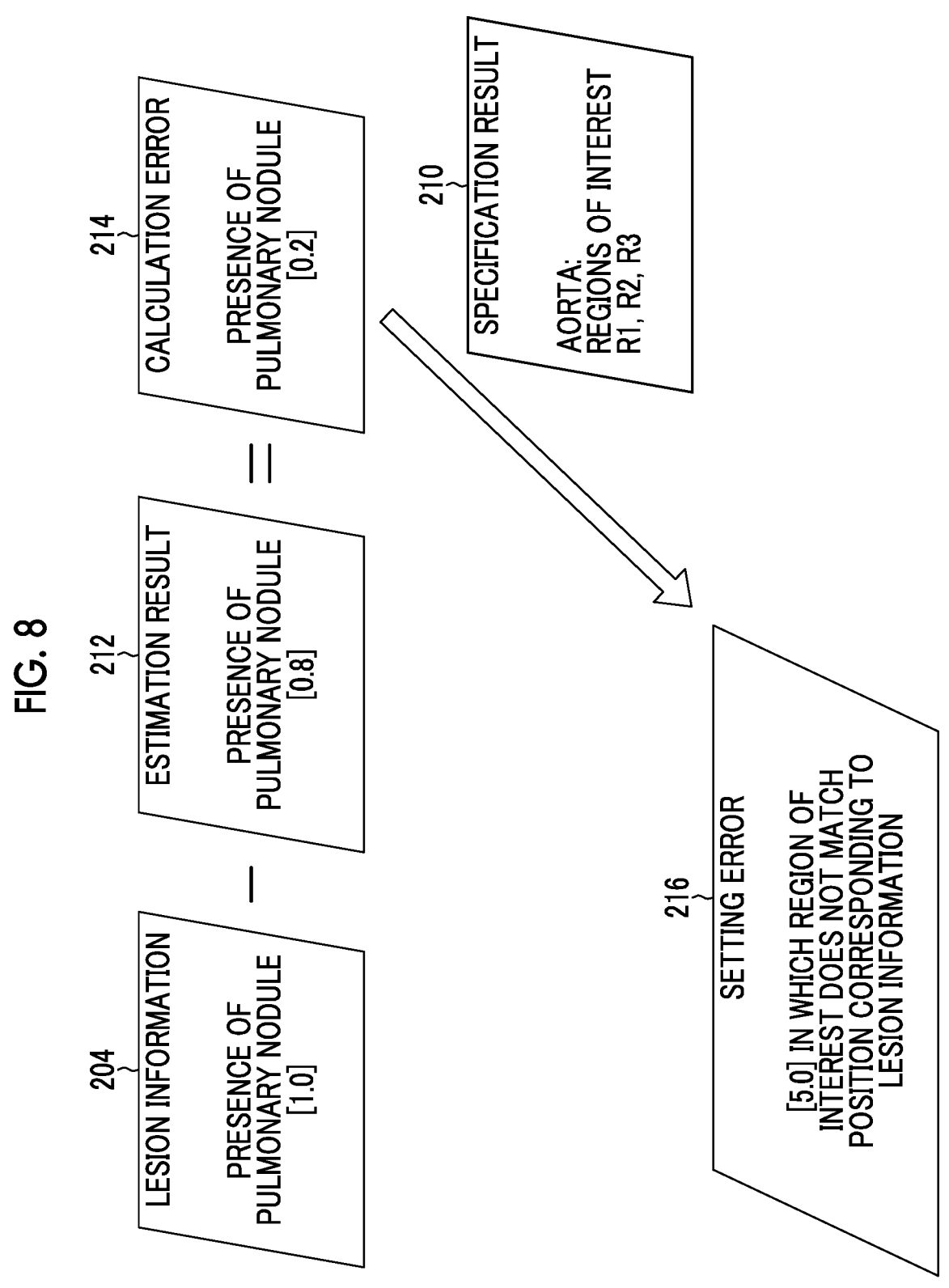
FIG. 8 is a diagram illustrating calculation of an error and setting of the error in an error acquisition unit.

FIG. 8 is a diagram illustrating calculation of the error and setting of the error in the error acquisition unit 136. The case described in FIG. 8 is a case in which the position corresponding to the lesion information 204 and the region of interest are different from each other, and is an example in which the error is set.

The error acquisition unit 136 acquires the calculation error 214 on the basis of the lesion information 204 and the estimation result 212. Since the lesion information 204 is the ground truth label (ground truth data) in machine learning and the lesion information 204 indicates the pulmonary nodule in the illustrated case, the score in the lesion information 204 is "presence of pulmonary nodule [1.0]". Further, the estimation result 212 is a result of estimating the disease output by the learning model 126, and the score in the estimation result 212 is "presence of pulmonary nodule [0.8]". Then, the error acquisition unit 136 calculates a score error between the lesion information 204 and the estimation result 212, and acquires the calculation error 214 of "presence of pulmonary nodule [0.2]".

Next, the error acquisition unit 136 sets the setting error 216 on the basis of the specification result 210. Here, since the lesion information 204 indicates the pulmonary nodule, the position corresponding to the lesion information 204 is "lung". Then, the error acquisition unit 136 compares the position corresponding to the lesion information 204 ("lung") with the position of the region of interest in the specification result 210 ("aorta"). In the illustrated case, the position corresponding to the lesion information 204 does not match the position of the region of interest in the specification result 210. In such a case, for example, the error acquisition unit 136 adds a score 4.8 to the score 0.2 of the calculation error 214 to set the setting error 216 (score 5.0). As a result, the setting error 216 becomes [5.0] in which the region of interest does not match the position corresponding to the lesion information. The setting of the setting error 216 described above is an example and is not limited thereto. In a case in which the position corresponding to the lesion information 204 does not match the position of the region of interest in the specification result 210, an error is added such that at least the setting error 216 has a higher score than the calculation error 214.

As described above, in the present embodiment, even in a case in which the estimation result 212 is close to the lesion information 204 (ground truth label) (in a case in which the error is small), the error is set to be large in a case in which the specification result 210 of the region of interest is not in the region corresponding to the lesion information 204.

The learning control unit 138 adjusts a coefficient of the filter, an offset value, and a weight of connection between preceding and succeeding layers applied to the convolutional layer in the learning model 126 by the error back-propagation method based on the error acquired by the error acquisition unit 136. Here, the learning control unit 138 performs learning of the learning model 126 by using the setting error 216 in a case in which the setting error 216 is set by the error acquisition unit 136 and by using the calculation error 214 in a case in which the setting error 216 is not set. Then, the learning control unit 138 repeatedly performs the adjustment processing of the coefficient and the like in the learning model 126 and causes the learning model 126 to perform learning such that a difference between the estimation result 212 of the learning model 126 and the lesion information 204 becomes small.

The learning control unit 138 advances learning of the learning model 126 sequentially in units of one set or minibatches of around 10 to 100 sets of the data sets 200 stored in the memory 114, and performs learning for optimizing the coefficient and the like in the learning model 126 to change an untrained learning model 126 to a trained learning model 126.

Next, the learning method using the learning apparatus 100 of the first embodiment and a program causing the processor 129 to execute each step will be described.

Figure 9:
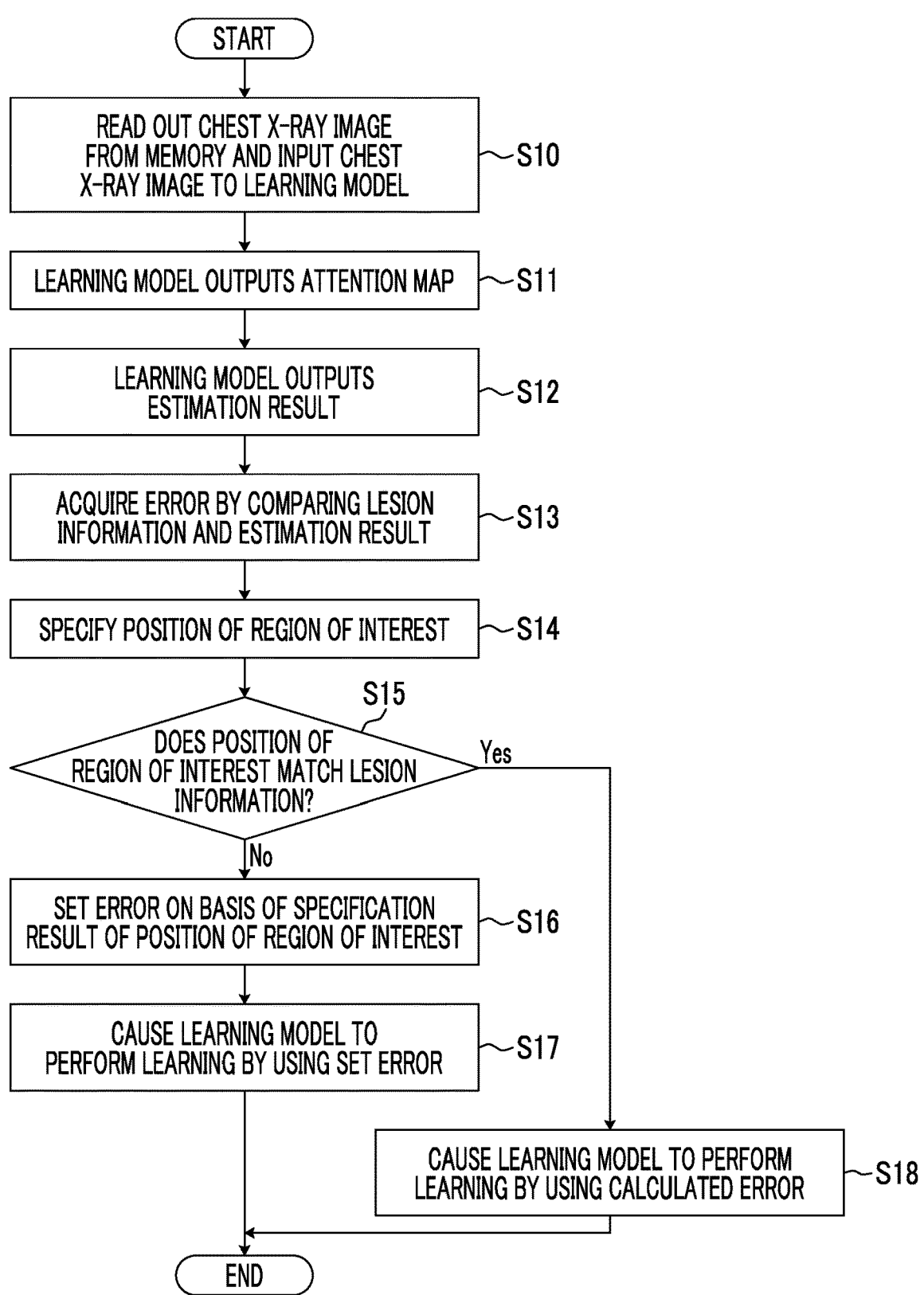
FIG. 9 is a flowchart illustrating a learning method using the learning apparatus and each step executed by a processor according to a program.

FIG. 9 is a flowchart illustrating the learning method using the learning apparatus 100 of the first embodiment and each step executed by the processor according to the program.

First, the training data acquisition unit 130 of the learning apparatus 100 reads out the chest X-ray image 202 from the memory 114 and inputs the chest X-ray image 202 to the learning model 126 (step S10). Thereafter, the attention mechanism 128 provided in the learning model 126 outputs the attention map 208 on the basis of the input chest X-ray image 202 (step S11). In addition, the learning model 126 performs disease detection on the basis of the input chest X-ray image 202 and outputs the estimation result 212 (step S12). Then, the error acquisition unit 136 acquires the error (calculation error 214) on the basis of the lesion information 204 and the estimation result 212 (step S13). Next, the specification unit 134 specifies the position of the region of interest of the attention map 208 in the organ labeling information 206 on the basis of the organ labeling information 206 generated by the organ labeling information generation unit 132 and the attention map 208, and outputs the specification result 210 (step S14). Then, the error acquisition unit 136 determines whether or not the position of the region of interest matches the position corresponding to the lesion information 204 on the basis of the specification result 210 (step S15).

In a case in which the position of the region of interest does not match the position corresponding to the lesion information 204, the error acquisition unit 136 sets the error calculated on the basis of the specification result 210 (step S16). Next, the learning control unit 138 causes the learning model 126 to perform learning by using the set error (setting error 216) (step S17). On the other hand, in a case in which the position of the region of interest matches the position corresponding to the lesion information 204, the learning control unit 138 causes the learning model 126 to perform learning by using the calculated error (calculation error 214) (step S18). The learning model 126 trained by the above-described learning method can perform disease detection with high accuracy.

As described above, with the learning apparatus 100 of the present embodiment, the specification result 210 obtained by specifying the position of the region of interest indicated by the attention map 208 in the organ labeling information 206 is output on the basis of the organ labeling information 206 and the attention map 208. Then, the learning apparatus 100 sets the error obtained by comparing the estimation result 212 with the lesion information 204 on the basis of the specification result 210, and performs learning by using the setting error 216. As a result, the learning apparatus 100 can efficiently perform learning for disease detection with high accuracy without requiring work such as annotation by a user.

Second Embodiment

Next, a second embodiment of the learning apparatus 100 will be described. In the present embodiment, a constrained image is generated on the basis of the specification result 210, and the generated constrained image is input to the learning model 126 to perform learning. In the following description, an example in which the pulmonary nodule is detected from the chest X-ray image 202 will be described, and differences from the first embodiment will be mainly described.

Figure 10:
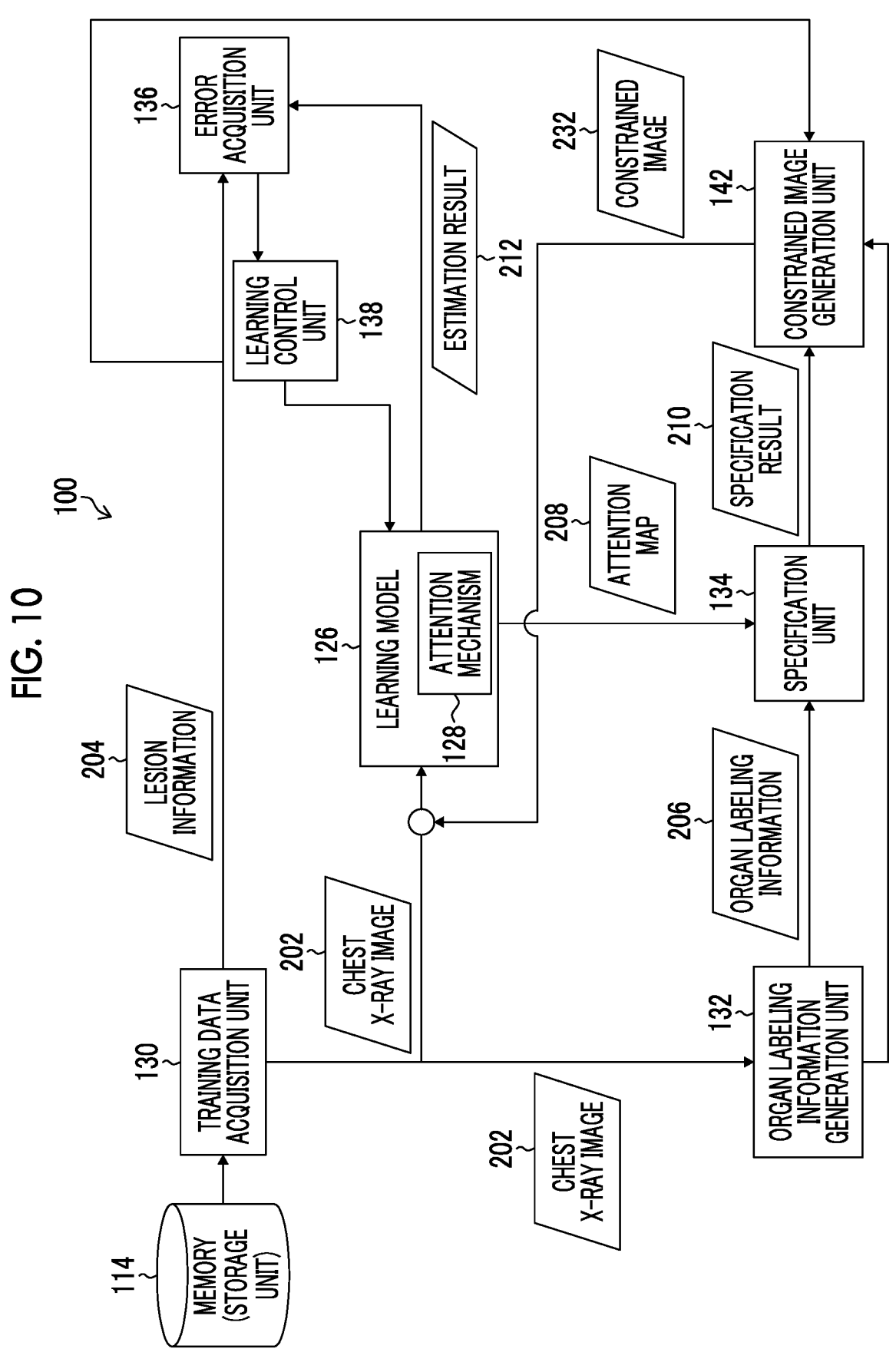
FIG. 10 is a block diagram illustrating a main function of the learning apparatus.

FIG. 10 is a block diagram illustrating a main function of the learning apparatus 100 according to the second embodiment. Parts already described in FIG. 2 will be denoted by the same reference numerals as described and the description thereof will be omitted.

The learning apparatus 100 mainly includes the memory 114, the processor 129, and the learning model 126. The processor 129 constitutes the training data acquisition unit 130, the organ labeling information generation unit 132, the specification unit 134, a constrained image generation unit 142, the error acquisition unit 136, and the learning control unit 138. In the present embodiment, instead of setting the setting error 216 in the first embodiment, a constrained image 232 is generated and input to the learning model 126.

The specification result 210, the chest X-ray image 202, and the lesion information 204 are input to the constrained image generation unit 142. Then, in a case in which the position of the region of interest does not match the position corresponding to the lesion information 204, the constrained image generation unit 142 imposes a constraint on the chest X-ray image 202. On the other hand, in a case in which the position of the region of interest matches the position corresponding to the lesion information 204, the constrained image generation unit 142 does not generate the constrained image 232.

Figure 11:
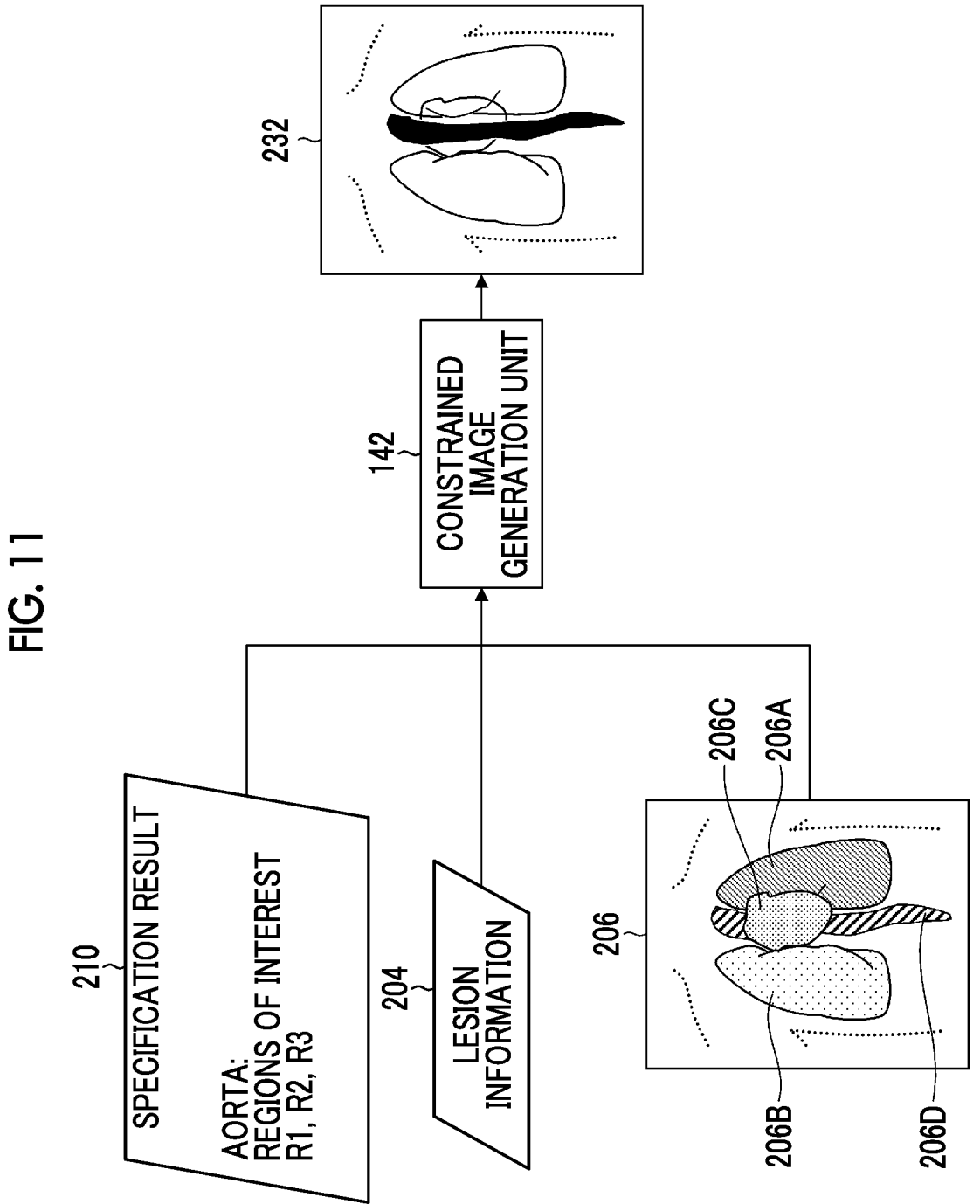
FIG. 11 is a diagram illustrating generation of a constrained image in a constrained image generation unit.

FIG. 11 is a diagram illustrating generation of the constrained image 232 in the constrained image generation unit 142.

The specification result 210, the lesion information 204, and the organ labeling information 206 are input to the constrained image generation unit 142. The lesion information 204 indicates the presence of the pulmonary nodule, and the region corresponding to the lesion information 204 is the region of the lung. In the present embodiment, the region corresponding to the lesion information 204 is acquired by the constrained image generation unit 142. In the specification result 210, since the regions of interest R1, R2, and R3 are present in the region of the aorta, the position of the region of interest does not match the position corresponding to the lesion information 204. In such a case, the constrained image 232 in which the aorta is constrained is generated in the present embodiment. Here, the constrained image generation unit 142 generates the constrained image 232 by imposing the constraint on the region of the aorta by various methods. In the illustrated case, the constrained image generation unit 142 generates the constrained image 232 by imposing the constraint by masking the region of the aorta. Here, masking the region of the aorta means cutting out an image of a region corresponding to the labeling information of the aorta in the chest X-ray image 202.

The constrained image 232 generated by the constrained image generation unit 142 is input to the learning model 126. Then, the learning model 126 outputs the estimation result 212 and the attention map 208 on the basis of the constrained medical image. The learning model 126 does not generate the feature amount map in the constrained region in a case in which the constrained image 232 is input, and the region of interest of the attention map 208 is not present in the constrained region. Accordingly, the learning model 126 can perform learning so as to output the estimation result 212 on the basis of the feature amount of an appropriate region.

Next, the learning method using the learning apparatus 100 of the second embodiment and a program causing the processor 129 to execute each step will be described.

Figure 12:
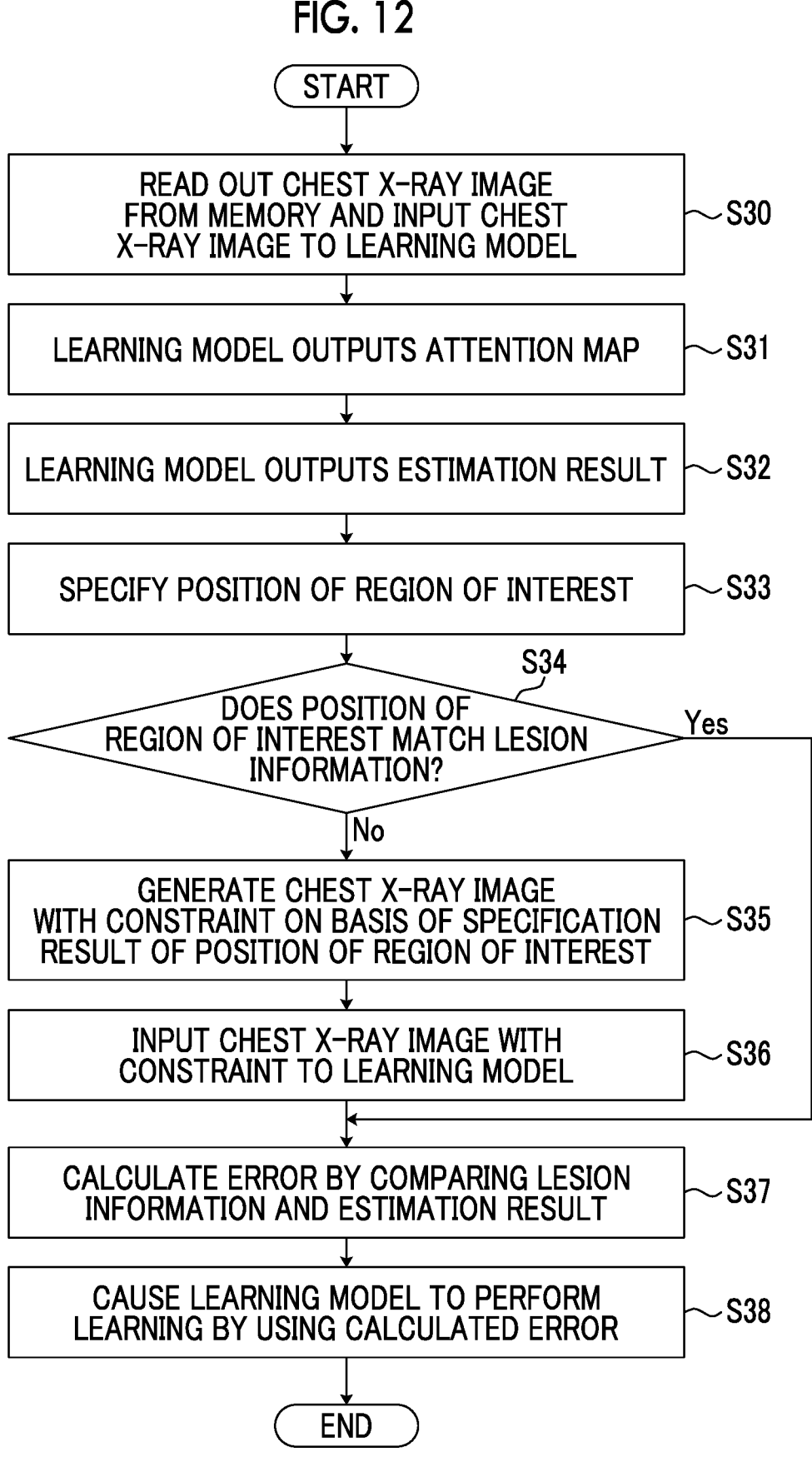
FIG. 12 is a flowchart illustrating the learning method using the learning apparatus and a program causing the processor to execute each step.

FIG. 12 is a flowchart illustrating the learning method using the learning apparatus 100 of the second embodiment and each step executed by the processor according to the program.

The training data acquisition unit 130 of the learning apparatus 100 reads out the chest X-ray image 202 from the memory 114 and inputs the chest X-ray image 202 to the learning model 126 (step S30). Thereafter, the attention mechanism 128 provided in the learning model 126 outputs the attention map 208 on the basis of the input chest X-ray image 202 (step S31). In addition, the learning model 126 performs disease detection on the basis of the input chest X-ray image 202 and outputs the estimation result 212 (step S32). Next, the organ labeling information 206 generated by the organ labeling information generation unit 132 and the attention map 208 are input to the specification unit 134, and the specification unit 134 specifies the position of the region of interest of the attention map 208 in the organ labeling information 206 and outputs the specification result 210 (step S33). Then, the error acquisition unit 136 determines whether or not the position of the region of interest matches the position corresponding to the lesion information 204 on the basis of the specification result 210 (step S34).

In a case in which the position of the region of interest does not match the position corresponding to the lesion information 204, the constrained image generation unit 142 generates the chest X-ray image 202 with a constraint on the basis of the specification result 210 (step S35). Thereafter, the generated constrained image 232 is input to the learning model 126 (step S36). Then, the error acquisition unit 136 calculates an error between the estimation result 212 in a case in which the constrained image 232 is input and the lesion information 204, and acquires the calculation error 214 (step S37). Next, the learning control unit 138 causes the learning model 126 to perform learning by using the calculation error 214 (step S38). On the other hand, in a case in which the position of the region of interest matches the position corresponding to the lesion information 204, the error acquisition unit 136 calculates the error between the estimation result 212 in a case in which the chest X-ray image 202 to which the constraint is not imposed is input and the lesion information 204, and acquires the calculation error 214 (step S37). Next, the learning control unit 138 causes the learning model 126 to perform learning by using the calculation error 214 (step S38). The learning model 126 trained by the above-described learning method can perform disease detection with high accuracy.

As described above, with the learning apparatus 100 of the present embodiment, the specification result 210 obtained by specifying the position of the region of interest indicated by the attention map 208 in the organ labeling information 206 is output on the basis of the organ labeling information 206 and the attention map 208. Then, in the present aspect, the constrained image 232 obtained by imposing the constraint on the chest X-ray image 202 is input to the learning model 126 on the basis of the specification result 210 and learning is performed. As a result, the learning apparatus 100 can efficiently perform learning for disease detection with high accuracy without requiring work such as annotation by a user.

<Examples of Other Diseases>

In the above-described example, an example of a combination of the lung (region corresponding to lesion information 204), the nodule (lesion information 204), and the aorta (excluded or constrained region) is described. However, the present invention may be applied to a combination of other target organs, abnormal (disease) regions, and regions with constraints. For example, the present invention is similarly applied to the heart (constrained region) with respect to pleural effusion (lesion information 204) having a characteristic of accumulating in the lower portion of the lung (region corresponding to lesion information 204) in a simple X-ray image.

<Use of Pseudo X-Ray Image>

In the above description, a case in which the chest X-ray image 202 is used as an example of the medical image is described. However, other images are also used as the medical image in the present invention. For example, another example of the medical image includes a pseudo X-ray image 304 obtained by projecting a computed tomography (CT) image.

Figure 13:
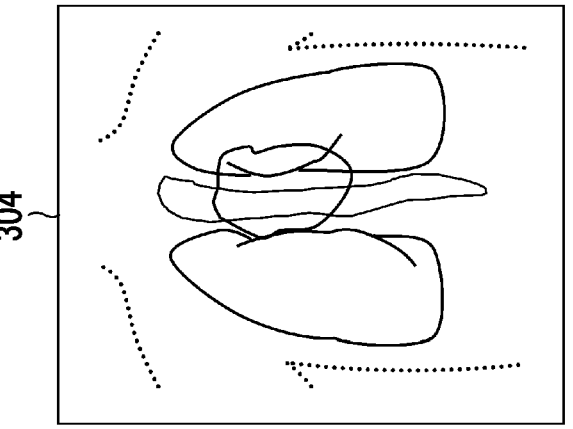
FIG. 13 is a diagram illustrating a pseudo X-ray image obtained from a CT image.
Figure 13:
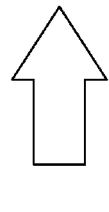
Figure 13:
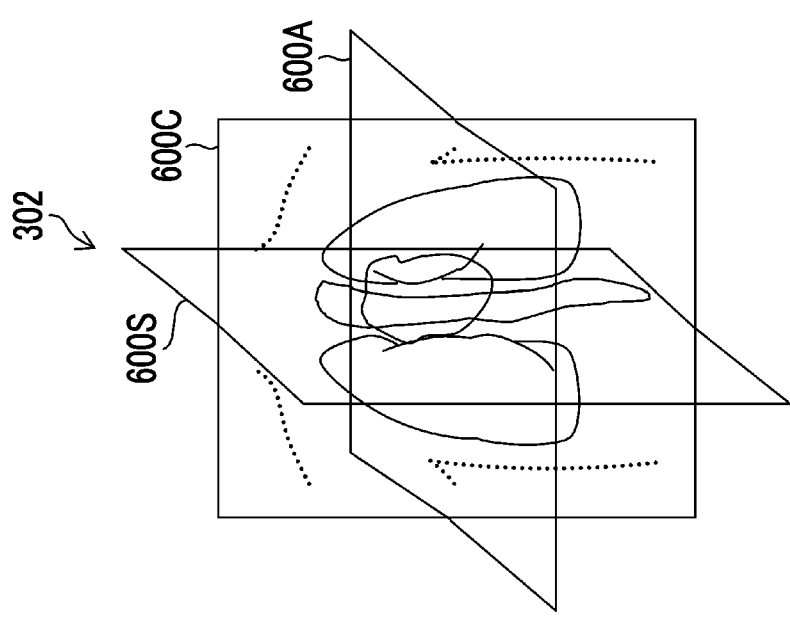

FIG. 13 is a diagram illustrating the pseudo X-ray image 304 obtained from a CT image 302.

The CT image 302 has three dimensional information. The pseudo X-ray image 304 having two dimensional information can be generated by projecting the CT image 302. For example, the pseudo X-ray image 304 may be generated from the CT image 302 by a trained model that has been trained to generate the pseudo X-ray image 304 on the basis of the CT image 302. In the X-ray CT image 302, cross-sections 600S, 600C, and 600A are cross-sections in a sagittal direction, a coronal direction, and an axial direction, respectively.

As described above, the pseudo simple X-ray image generated from the CT image 302 can be used as the medical image applied to the present invention.

<Generation and Use of Isolated Image>

In the above-described example, an example in which the organ labeling information generation unit 132 generates the organ labeling information 206 on the basis of the chest X-ray image 202 and the organ labeling information 206 is input to the specification unit 134 is described. In the present invention, instead of the organ labeling information 206, an isolated image which is an image isolated for each organ may be input to the specification unit 134.

Figure 14:
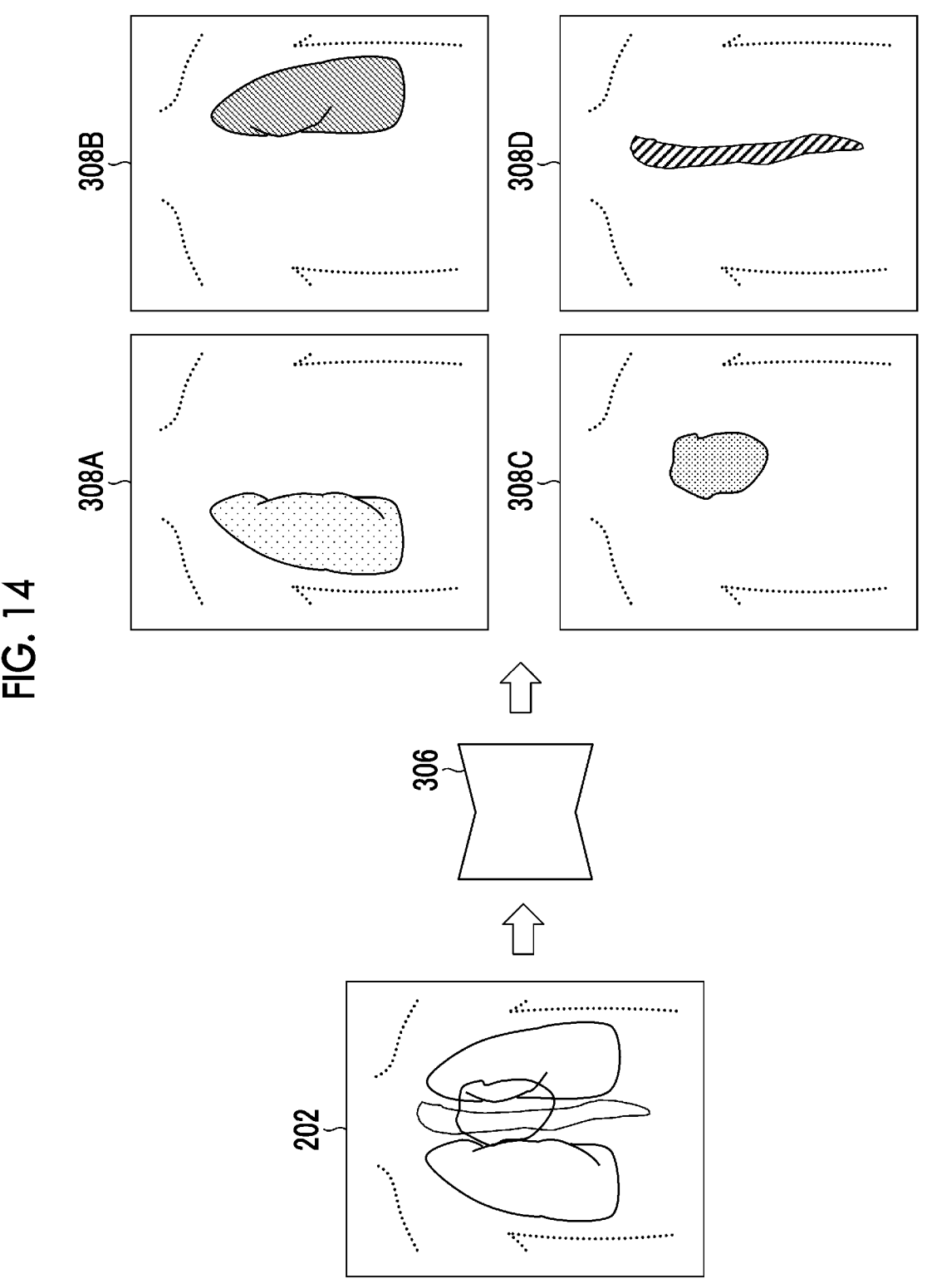
FIG. 14 is a diagram illustrating generation of an isolated image.

FIG. 14 is a diagram illustrating generation of the isolated image.

A generator 306 is a trained model that generates an isolated image for each organ from an X-ray image. In the illustrated case, the chest X-ray image 202 is input to the generator 306 and isolated images 308A to 308D isolated for each organ are generated. Specifically, the generator 306 generates a right lung isolated image 308A, a left lung isolated image 308B, a heart isolated image 308C, and an aorta isolated image 308D from the chest X-ray image 202. Then, the isolated images 308A to 308D are input to the specification unit 134 instead of the organ labeling information 206. The specification unit 134 outputs the specification result 210 on the basis of the isolated images 308A to 308D and the attention map 208.

<Others>

In the above embodiment, the hardware structures of the processing units that execute various pieces of processing are various processors as follows. The various processors include: a central processing unit (CPU) that is a general-purpose processor functioning as various processing units by executing software (program); a programmable logic device (PLD) that is a processor of which circuit configuration can be changed after manufacture, such as a field programmable gate array (FPGA); a dedicated electrical circuit that is a processor having circuit configuration designed exclusively to execute specific processing, such as an application specific integrated circuit (ASIC); and the like.

One processing unit may be configured by one of these various processors, or may be configured by two or more processors of the same type or different types (for example, a plurality of FPGAs or a combination of a CPU and an FPGA). In addition, a plurality of processing units may be configured by one processor. As an example in which the plurality of processing units are configured by one processor, first, as represented by a computer, such as a client or a server, there is an aspect in which the one processor is configured by a combination of one or more CPUs and software and functions as the plurality of processing units. Second, as represented by a system on chip (SoC) or the like, there is an aspect in which a processor that realizes the functions of the entire system including the plurality of processing units with one integrated circuit (IC) chip is used. As described above, the various processing units are configured using one or more of the above-described various processors as hardware structures.

Further, the hardware structure of these various processors is more specifically an electric circuit (circuitry) in which circuit elements such as semiconductor elements are combined.

Each of the above-described configurations and functions can be appropriately realized by any hardware, software, or a combination of both. For example, the present invention can be applied to a program for causing a computer to execute the above-described processing steps (processing procedures), a computer-readable recording medium (non-transitory recording medium) on which such a program is recorded, or a computer on which such a program can be installed.

Although examples of the present invention have been described above, it goes without saying that the present invention is not limited to the above-described embodiments and various modifications may be made without departing from the scope of the present invention.

EXPLANATION OF REFERENCES

100: learning apparatus
112: communication unit
114: memory
116: operation unit
118: CPU
120: RAM
122: ROM
124: display unit
126: learning model
128: attention mechanism
129: processor
130: training data acquisition unit
132: organ labeling information generation unit
34: specification unit
36: error acquisition unit
38: learning control unit
42: constrained image generation unit

What is claimed is:

1. A learning apparatus comprising:
a processor; and
a memory that stores:
a data set of a medical image and lesion information included in the medical image; and a learning model with an attention mechanism that estimates a disease from an input medical image, wherein the processor is configured to implement the learning model to perform:

processing of outputting an attention map indicating a region of interest in the medical image from the input medical image by the attention mechanism; and processing of outputting an estimation result of the disease estimated from the input medical image, and the processor is further configured to perform:

processing of specifying a position of the region of interest indicated by the attention map in organ labeling information, which indicates a type and a region of an organ appearing in the medical image, on the basis of the organ labeling information and the attention map, and outputting a specification result;

processing of calculating an error by comparing the estimation result with the lesion information;

processing of determining whether the position of the region of interest matches the lesion information;

processing of causing the learning model to performing learning by using the error which has been calculated in response to the position of the region of interest matching the lesion information;

processing of setting the error on the basis of the specification result in response to the position of the region of interest not matching the lesion information; and processing of causing the learning model to perform learning by using the error that has been set.

2. A learning apparatus comprising:

a processor; and a memory that stores:

a data set of a medical image and lesion information included in the medical image; and a learning model with an attention mechanism that estimates a disease from an input medical image, wherein the processor is configured to implement the learning model to perform:

processing of outputting an attention map indicating a region of interest in the medical image from the input medical image by the attention mechanism, and processing of outputting an estimation result of the disease estimated from the input medical image, and the processor is further configured to perform:

processing of specifying a position of the region of interest indicated by the attention map in organ labeling information, which indicates a type and a region of an organ appearing in the medical image, on the basis of the organ labeling information and the attention map, and outputting a specification result;

processing of imposing a constraint on the medical image on the basis of the specification result;

processing of inputting the medical image with the constraint to the learning model;

processing of calculating an error by comparing an estimation result output by the learning model on the basis of the medical image with the constraint, with the lesion information;

processing of determining whether the position of the region of interest matches the lesion information;

processing of causing the learning model to performing learning by using the error which has been calculated in response to the position of the region of interest matching the lesion information;

processing of setting the error on the basis of the specification result in response to the position of the region of interest not matching the lesion information; and processing of causing the learning model to perform learning by using the error that has been set.

3. The learning apparatus according to claim 1, wherein the processor sets the error by increasing the error in a case in which the position of the region of interest in the specification result is different from a position corresponding to the lesion information.

4. The learning apparatus according to claim 2, wherein the processor imposes the constraint on a location corresponding to the region of interest of the medical image in a case in which the position of the region of interest in the specification result is different from a position corresponding to the lesion information.

5. The learning apparatus according to claim 1, further comprising:

a segmentation trained model that acquires the organ labeling information from the medical image.

6. The learning apparatus according to claim 1, wherein the attention map is formed of a heat map indicating a degree of contribution to estimation of the learning model.

7. The learning apparatus according to claim 1, wherein the medical image is a chest X-ray image.

8. The learning apparatus according to claim 7, wherein the organ labeling information includes at least information indicating a region of an aorta in the medical image.

9. The learning apparatus according to claim 7, wherein the organ labeling information includes at least information indicating a region of a lung in the medical image.

10. The learning apparatus according to claim 7, wherein the lesion information includes information on a pulmonary nodule.

11. The learning apparatus according to claim 7, wherein the organ labeling information includes at least information indicating a region of a heart in the medical image.

12. The learning apparatus according to claim 7, wherein the lesion information includes information on pleural effusion.

13. A learning method in which a processor causes a learning model with an attention mechanism, which estimates a disease from an input medical image, to perform learning by using a data set of the medical image and lesion information included in the medical image stored in a memory, wherein the learning model performs processing of outputting an attention map indicating a region of interest in the medical image from the input medical image by the attention mechanism, and processing of outputting an estimation result of the disease estimated from the input medical image, and the learning method comprises:

a step of specifying a position of the region of interest indicated by the attention map in organ labeling information, which indicates a type and a region of an organ appearing in the medical image, on the basis of the organ labeling information and the attention map, and outputting a specification result;

a step of calculating an error by comparing the estimation result with the lesion information;

a step of determining whether the position of the region of interest matches the lesion information;

a step of causing the learning model to performing learning by using the error which has been calculated in response to the position of the region of interest matching the lesion information;

a step of setting the error on the basis of the specification result in response to the position of the region of interest not matching the lesion information; and a step of causing the learning model to perform learning by using the error that has been set.

14. A learning method in which a processor causes a learning model with an attention mechanism, which estimates a disease from an input medical image, to perform learning by using a data set of the medical image and lesion information included in the medical image stored in a memory, wherein the learning model performs processing of outputting an attention map indicating a region of interest in the medical image from the input medical image by the attention mechanism, and processing of outputting an estimation result of the disease estimated from the input medical image, and the learning method comprises:

a step of specifying a position of the region of interest indicated by the attention map in organ labeling information, which indicates a type and a region of an organ appearing in the medical image, on the basis of the organ labeling information and the attention map, and outputting a specification result;

a step of imposing a constraint on the medical image on the basis of the specification result;

a step of inputting the medical image with the constraint to the learning model;

a step of calculating an error by comparing an estimation result output by the learning model on the basis of the medical image with the constraint, with the lesion information;

a step of determining whether the position of the region of interest matches the lesion information;

a step of causing the learning model to performing learning by using the error which has been calculated in response to the position of the region of interest matching the lesion information; and a step of setting the error on the basis of the specification result in response to the position of the region of interest not matching the lesion information; and a step of causing the learning model to perform learning by using the error that has been set.

15. A non-transitory, computer-readable tangible recording medium on which a program for causing, when read by a computer, the computer to execute the learning method according to claim 13 is recorded.

16. A non-transitory, computer-readable tangible recording medium on which a program for causing, when read by a computer, the computer to execute the learning method according to claim 14 is recorded.

17. The learning method according to claim 13 further comprises training a trained model based on the learning method.

18. The learning method according to claim 14 further comprises training a trained model based on the learning method.

* * * * *